(12) United States Patent
Kawai

(10) Patent No.: US 8,499,089 B2
(45) Date of Patent: Jul. 30, 2013

(54) MANAGEMENT DEVICE, MANAGING METHOD AND COMPUTER PROGRAM

(75) Inventor: Sunao Kawai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 588 days.

(21) Appl. No.: 12/699,320

(22) Filed: Feb. 3, 2010

(65) Prior Publication Data

US 2010/0198976 A1 Aug. 5, 2010

(30) Foreign Application Priority Data

Feb. 3, 2009 (JP) ................................. 2009-022874

(51) Int. Cl.
*G06F 15/16* (2006.01)
*G06F 15/173* (2006.01)

(52) U.S. Cl.
USPC .......................................... 709/230; 709/238

(58) Field of Classification Search
USPC ................................................ 709/230, 238
See application file for complete search history.

(56) References Cited

U.S. PATENT DOCUMENTS

| 6,795,862 B1 | 9/2004 | Keohane et al. |
| 2005/0128957 A1 | 6/2005 | Yuki |
| 2006/0015587 A1 | 1/2006 | Bose |
| 2006/0041917 A1 | 2/2006 | Vellanki et al. |
| 2007/0011326 A1 | 1/2007 | Ohara |
| 2008/0077700 A1 | 3/2008 | Hibino |
| 2008/0140822 A1 | 6/2008 | Torii |

FOREIGN PATENT DOCUMENTS

| CN | 1901546 A | 1/2007 |
| EP | 1 531 599 A1 | 5/2005 |
| JP | 2006-85643 | 3/2006 |
| JP | 2008-503819 | 2/2008 |
| JP | 2008-85679 | 4/2008 |
| JP | 2008-146410 | 6/2008 |
| JP | 2008-283373 | 11/2008 |
| WO | WO 98/34385 | 8/1998 |
| WO | WO 2008/049870 A2 | 5/2008 |

OTHER PUBLICATIONS

Japanese Official Action dated Oct. 19, 2010 with English language translation.
Extended European Search Report dated Jun. 22, 2010.
Chinese Official Action dated Jul. 25, 2012 with English language translation received from related case, namely, Application No. 201010113432.5.
Chinese Office Action and English translation dated Mar. 22, 2013 issued in corresponding Chinese Patent Application No. 201010113432.5.

*Primary Examiner* — Hee Soo Kim
(74) *Attorney, Agent, or Firm* — Scully, Scott, Murphy & Presser PC

(57) ABSTRACT

When a target device as a target of the current communication is an SNMPv3-compatible device corresponding to both protocols of the SNMPv1 and SNMPv3, the protocol used in the previous communication is identified, the order of priority of the protocols used in communication with the target device is determined on the basis of the determination result, and the communication with the target device is attempted in accordance with the order of priority of the determined protocols.

11 Claims, 9 Drawing Sheets

FIG. 4

| Status: | All Devices | ▼ | Filter: | All Devices | ▼ | Column: | Default | ▼ |
|---|---|---|---|---|---|---|---|---|

| Node Name | Model Name | Device Status | IP Address | Log | Location | Contact |
|---|---|---|---|---|---|---|
| MFP300A | MFP-2345 | SLEEP | 192.168.0.10 | — | 2F | |
| MFP300B | MFP-2345 | SLEEP | 192.168.0.11 | — | 2F | |
| MFP300C | MFP-2345 | 01/05/2009 19:07 | 192.168.0.12 | — | 2F | kawai |
| MFP300D | MFP-1234 | SLEEP | 196.168.0.13 | — | 2F | |

Critical Error:0 Non-Critical Error:0 Communication Error:0     Devices:3

DEVICE INFORMATION 224

| IP ADDRESS | PREVIOUS CONNECTION INFORMATION (GET) | PREVIOUS CONNECTION INFORMATION (SET) | NODE NAME | MODEL NAME | STATUS | OPERATION MODE | V3-COMPATIBLE | Location |
|---|---|---|---|---|---|---|---|---|
| 192.168.0.10 | SNMPv1 | SNMPv1 | MFP300A | MFP-2345 | SLEEP | SNMPv1 | YES | 2F |
| 192.168.0.11 | SNMPv3 | SNMPv3 | MFP300B | MFP-2345 | SLEEP | SNMPv3 | YES | 2F |
| 192.168.0.12 | SNMPv1 | SNMPv3 | MFP300C | MFP-2345 | 01/05/2009 19:07 | SNMPv3 +SNMPv1-R/O | YES | 2F |
| 192.168.0.13 | SNMPv1 | SNMPv1 | MFP300D | MFP-1234 | SLEEP | SNMPv1 | — | 2F |
| ... | ... | ... | ... | ... | ... | ... | ... | ... |

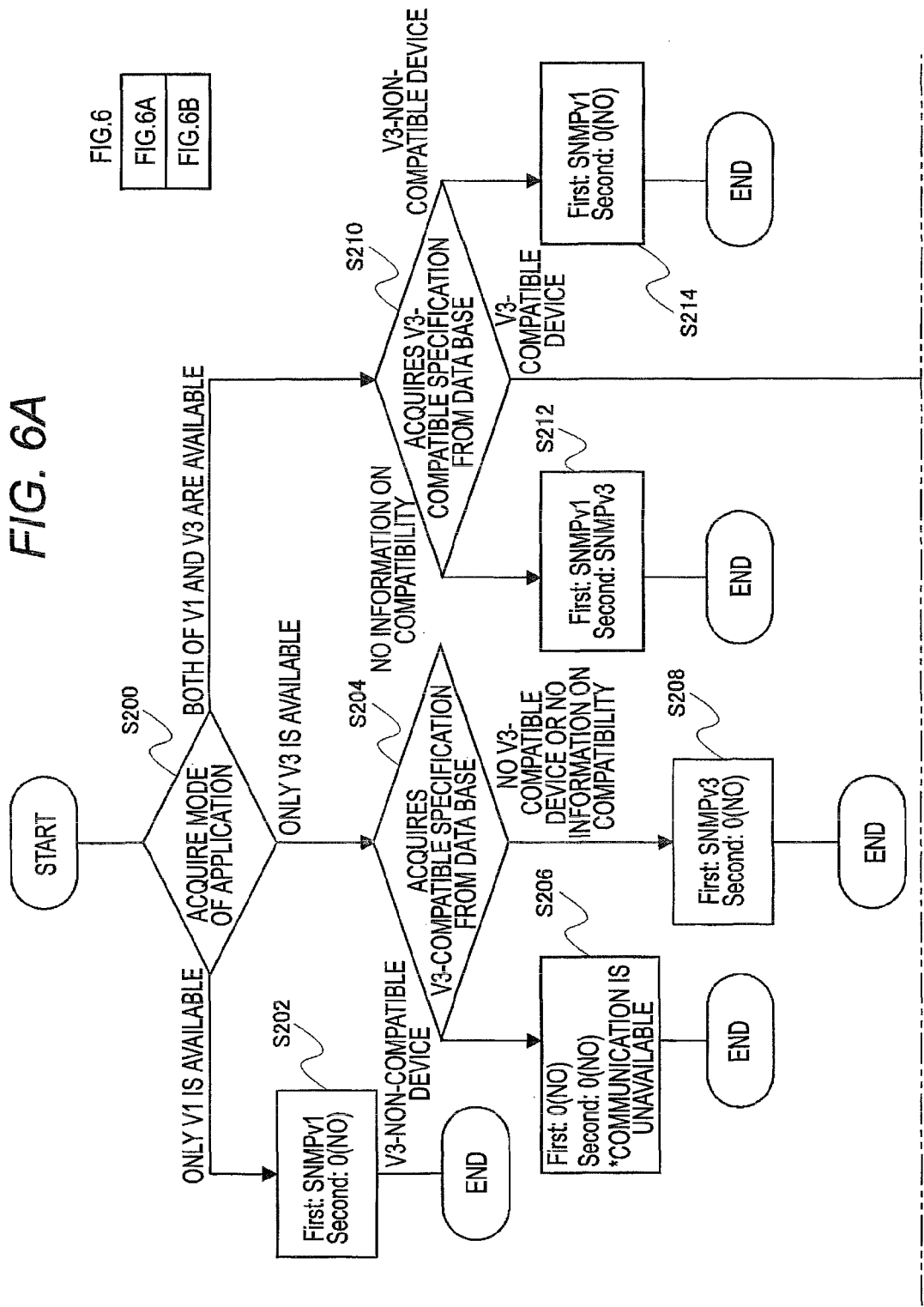

US 8,499,089 B2

MANAGEMENT DEVICE, MANAGING METHOD AND COMPUTER PROGRAM

CROSS REFERENCE TO RELATED APPLICATION

The present application claims priority from Japanese Patent Application No. 2009-022874, which was filed on Feb. 3, 2009, the disclosure of which is incorporated herein by reference in its entirety.

BACKGROUND

The present invention relates to determination of protocol used for communication with a device connected to enable communication.

Generally, network systems are built so that various devices are connected thereto so as to enable communication to a network. These network systems include a management device for managing various devices. When the management device communicates with the various devices through the network, a predetermined protocol, for example, the SNMP (Simple Network Management Protocol) is used.

Recently, it has become important to secure security for network communication. For the above-mentioned SNMP, the new SNMPv3 (version 3) having a security function was created, and some devices are compatible with the SNMPv3.

SUMMARY

However, when a new protocol (for example, SNMPv3) is created as described above, some of the devices provided thereafter are compatible with the new protocol. However, it is difficult for a management device using the new protocol to perform communication, based on the new protocol, with a device which has been in use since before the new protocol was created, or a device which, although provided after the creation of the new protocol, is not compatible therewith. During the period of transition into the new protocol, a device which is not compatible with the new protocol and a device which is compatible therewith exist together in the network system.

In the embodiment of the invention, it is desired to enable a management device to communicate promptly with a communication target device when a first type device which is not compatible with a predetermined protocol and a second type device which is compatible therewith exist together.

The invention has been made in view of the above, and is configured as follows. When the current communication target device is the second type device which is compatible with the first protocol and the second protocol, an order of priority of protocols used in communication with the target device is determined on the basis of the protocol used in the previous communication. Then, depending on the determined order of priority of the protocol, communication with the target device is attempted.

A management device according to one aspect of the invention for managing a first type device which is compatible with a first protocol and is not compatible with a second protocol and a second type device which is compatible with the first protocol and the second protocol, the second type device being set in any one of a plurality of operation modes including a first mode in which communication is available not through the second protocol but through the first protocol, and a second mode in which communication is available not through the first protocol but through the second protocol, comprises:

a device determination unit that determines whether a target device as a target of current communication is the first type device or the second type device;

an available-protocol determination unit that, when the device determination means determines that the target device is the second type device, identifies the protocol used in previous communication with the target device, and determines priority of the protocol to be used to attempt the current communication with the target device; and a communication unit that attempts communication with the target device in accordance with the priority of the protocol determined by the available-protocol determination unit, wherein the available-protocol determination unit sets the priority of the protocol in order of the second protocol and the first protocol if the previous communication is performed through the second protocol, and sets the priority of the protocol in order of the first protocol and the second protocol if the previous communication is performed through the first protocol.

BRIEF DESCRIPTION OF THE DRAWINGS

FIG. 4 is a diagram illustrating a management screen.

FIG. 5 is a diagram illustrating data base.

FIGS. 6A and 6B are diagrams illustrating a flow of communication protocol determination processing.

DESCRIPTION OF EXEMPLARY EMBODIMENTS

Figure 1:
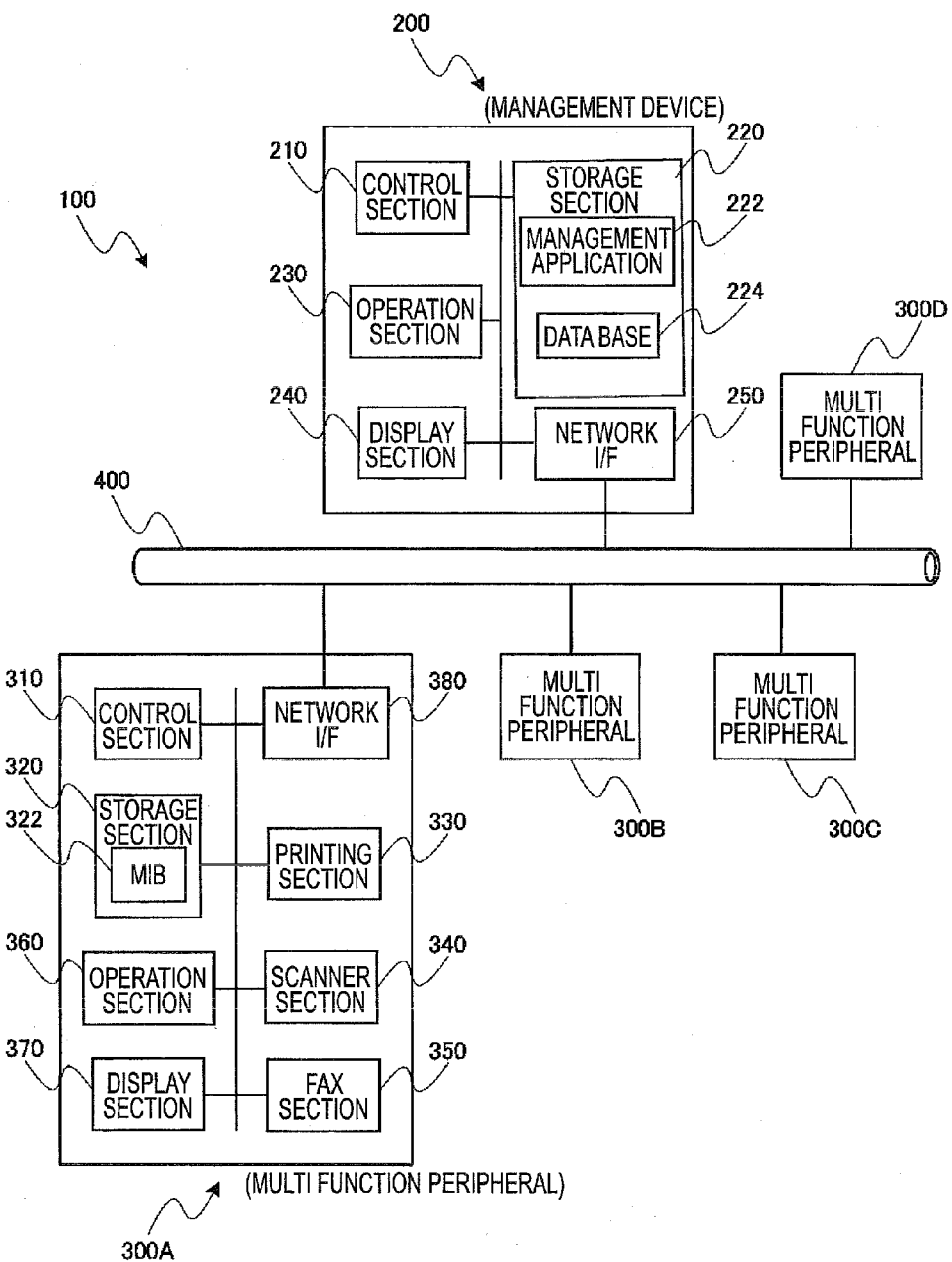
FIG. 1 is a diagram illustrating function blocks of the network system and the respective devices.

An exemplary embodiment according to the present invention will be described below in detail with reference to the accompanying drawings. The present invention is not limited to the configurations described below, and may employ various configurations within the same technical scope thereof.

(Configuration of System)

The network system 100 includes a management device 200, and multi function peripherals 300A, 300B, 300C, and 300D which are devices as management targets of the management device 200. The management device 200 and the multi function peripherals 300A, 300B, 300C, and 300D are communicatively connected through a network 400.

The management device 200 is provided with a control section 210 for controlling the device itself and a storage section 220. The storage section 220 stores a management application 222 and data base 224 in which device information is registered. The control section 210 includes a CPU for executing calculation processing, a ROM for storing various programs, and a RAM as a work area. The storage section 220 is formed as, for example, a hard disk. In the data base 224 stored in the storage section 220, the device information, which is acquired when the control section 210 acquires predetermined device information by communicating with the respective devices included in the network system 100, is registered. The device information will be described later.

Further, the management device 200 has an operation section 230 which includes a keyboard and a mouse and functions as an input interface (hereinafter, the interface is referred to as "I/F") for various data used to execute programs. In addition, the management device 200 has a network I/F 250 as a connection I/F between the display section 240 for displaying various information and the network 400.

The CPU constituting the control section 210 executes the management application 222 and the like on the RAM on the basis of data which is input through the operation section 230 and the data which is acquired by using the network I/F 250, thereby executing various kinds of processing. With such a configuration, it is possible to embody various function means (for example, the device determination means, the available-protocol determination means, and the communication means).

Next, the multi function peripheral 300A is described. Furthermore, since the multi function peripherals 300B, 300C, and 300D have the same configuration as the multi function peripheral 300A, description thereof is omitted. The multi function peripheral 300A includes a control section 310 for controlling the device itself and a storage section 320 for storing an MIB (Management Information Base) 322. Here, the control section 310 includes a CPU for executing calculation processing, a ROM for storing various programs, and a RAM as a work area. The storage section 320 is formed as, for example, a non-volatile memory (for example, an EEPROM) or a hard disk. The MIB 322 is a data base in which the device information as a management target using the SNMP is registered.

Further, the multi function peripheral 300A includes a printing section 330 used to execute a print function, a copy function, and a facsimile function, a scanner section 340 for scanning an original document placed on a document placing section (not shown in the drawing), and a facsimile (FAX) section 350 for executing a facsimile function by connecting to a public line net. Then, the multi function peripheral 300A includes an operation section 360 for functioning as an input I/F of data and a network I/F 380 as a connection I/F between the display section 370 for displaying various information and the network 400. The operation section 360 includes, for example, an arrow keypad, a confirmation button and a numeric keypad by which characters can be input.

The CPU, which constitutes the control section 310, executes a program stored in the ROM, thereby executing various kinds of processing and embodying various function means. In this case, various data such as data received by the network I/F 380 is input to and retained in the RAM. The CPU accesses the RAM in order to execute processing based on these data. For example, in the case of a request (Get Request) for acquiring the device information registered in the MIB 322, the control section 310 transmits the device information, which corresponds to an OID (Object ID) designated by the acquisition request, to a request source device (for example, the management device 200) (Get Response). Furthermore, in the case of a request (Set Request) of setting the device information registered in the MIB 322, the control section 310 changes the device information, which corresponds to the OID designated by the setting request, into new device information included in the Set Request. Then, the control section 310 transmits the result to the request source device (Get Response).

The device compatible with both protocols of SNMPv1 and SNMPv3 is hereinafter referred to a "SNMPv3-compatible device". The SNMPv3-compatible device can be set by the following first to third operation modes.

The first mode is a mode of "sNMPv1-R/W (Read Write)". When set in the first mode, in the case of the acquisition and setting requests based on the SNMPv3, the SNMPv3-compatible device is unable to respond to all of these. However, in the case of the acquisition and setting requests based on the SNMPv1, the device is able to respond to only the device information based on the SNMPv1 (detailed description thereof will be described later with reference to FIG. 2).

The second mode is a mode of "SNMPv3-R/W". When set in the second mode, in the case of the acquisition and setting requests based on the SNMPv3, the SNMPv3-compatible device is able to respond to all of these. However, in the case of the acquisition and setting requests based on the SNMPv1, the device is unable to respond to all of these.

The third mode is mode of "SNMPv3-R/W+SNMPv1-R/O (Read Only)". When set in the third mode, in the case of the acquisition and setting requests based on the SNMPv3, the SNMPv3-compatible device is able to respond to all of these. Further, in the case of the acquisition requests based on the SNMPv1, the device is able to respond to only the device information based on the SNMPv1. In contrast, in the case of the setting requests based on the SNMPv1, the device is unable to respond to all of these.

Here, the settings of the operation modes are exclusively performed. That is, the first mode, the second mode, and the third mode are set not to overlap with each other. Furthermore, similarly to the case where the SNMPv3-compatible device is set in the first mode, in the case of the acquisition and setting requests based on the SNMPv1, an SNMPv3-non-compatible device (SNMPv1-compatible device), which is only compatible with the SNMPv1 and not with the SNMPv3, is able to respond to all of these.

Hereinafter, the multi function peripheral 300A is described as the SNMPv3-compatible device set in the first mode. Further, the multi function peripheral 300B is described as the SNMPv3-compatible device set in the second mode, and the multi function peripheral 300C is described as the SNMPv3-compatible device set in the third mode. In addition, the multi function peripheral 300D is described as the SNMPv3-non-compatible device (the SNMPv1-compatible device).

Figure 2:
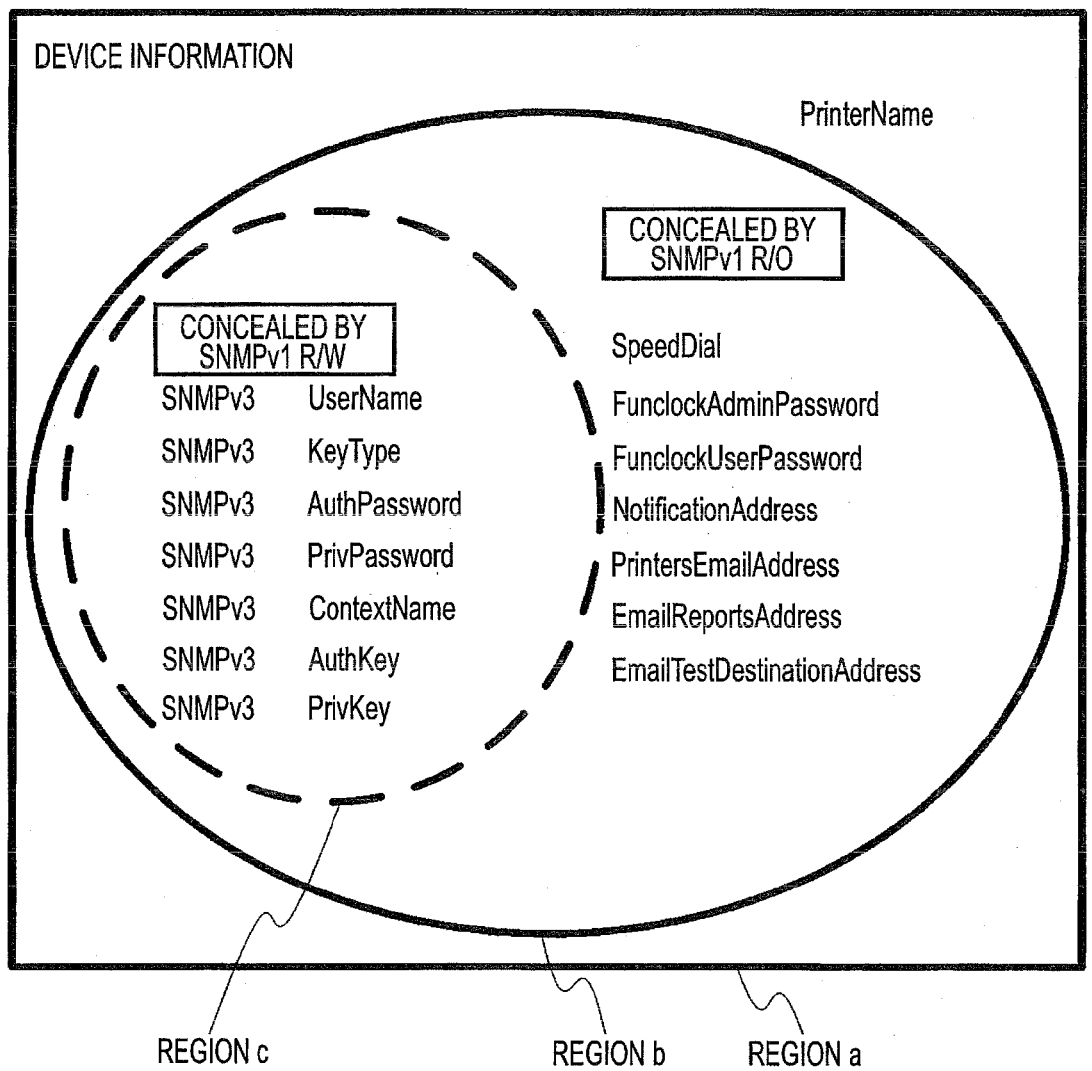
FIG. 2 is a diagram illustrating a relationship between device information and operation modes registered in an SNMPv3-compatible device.

FIG. 2 is a diagram illustrating a relationship between the device information and the operation modes that can be registered in the SNMPv3-compatible device. Furthermore, the device information is registered in the MIB 322. The detailed description of the respective device information shown in FIG. 2 is omitted.

For example, the multi function peripheral 300A set in the first mode (SNMPv1-R/W) may receive the acquisition and setting requests based on the SNMPv1 from the management device 200. In this case, the multi function peripheral 300A is able to reply with the device information in the region (a-c), that is, the device information excluding the device information included in the region c from the device information included in the region a, and is able to change the device information. For example, in response to an inquiry (an acquisition request) for a printer name (PrinterName), the multi function peripheral 300A replies with the printer name of the multi function peripheral 300A. Further, in response to the request of change (the setting request) of a speed dial (SpeedDial), the speed dial is changed. Further, in the case of the acquisition and setting requests based on the SNMPv3, the multi function peripheral 300A does not respond to all of these. In addition, even in the case of the acquisition and setting requests based on the SNMPv1, the device information in the region c, for example, "SNMPv3 UserName" is not subjected to the reply and change processing.

Further, for example, the multi function peripheral 300B set in the second mode (SNMPv3-R/W) may receive the acquisition and setting requests based on the SNMPv3 from the management device 200. In this case, the multi function peripheral 300B is able to reply with the device information included in the region a, and is able to change the device information. For example, the multi function peripheral 300B replies with the administrator password registered in the MIB 322 in response to the inquiry (the acquisition request) for the administrator password (funcLockAdminPassword) used to restrict the function of the multi function peripheral 300B in the region b. Further, in response to the request of change (the setting request) of the key type (SNMPv3 KeyType1) in the region c, the multi function peripheral 300B changes the key type. Furthermore, the multi function peripheral 300B does not respond to all of the acquisition and setting requests based on the SNMPv1.

For example, the multi function peripheral 300C set in the third mode (SNMPv3-R/W+SNMPv1-R/O) may receive the acquisition and setting requests based on the SNMPv3 from the management device 200. In this case, the multi function peripheral 300C makes the same response as the above-mentioned multi function peripheral 300B. Further, the multi function peripheral 300C may receive the acquisition request based on the SNMPv1. In this case, when the acquisition request relates to the device information (the printer name in FIG. 2) included in the region (a-b), the multi function peripheral 300C replies with the device information (the printer name). In contrast, when the acquisition request based on the SNMPv1 relates to, for example, the device information included in the region b, the multi function peripheral 300C replies, in response to the acquisition request, with information to the effect that the device information on the acquisition request is not registered in the MIB 322. The reason is that a configuration, in which no response is available for the acquisition request based on the SNMPv1 with no security, is adopted on the basis of the fact that the device information (for example, Password) on security is included in the region b. Furthermore, since the third mode is the SNMPv1-R/O (Read Only), the multi function peripheral 300C does not respond to the setting request based on the SNMPv1.

(Communication Control Processing)

Figure 3:
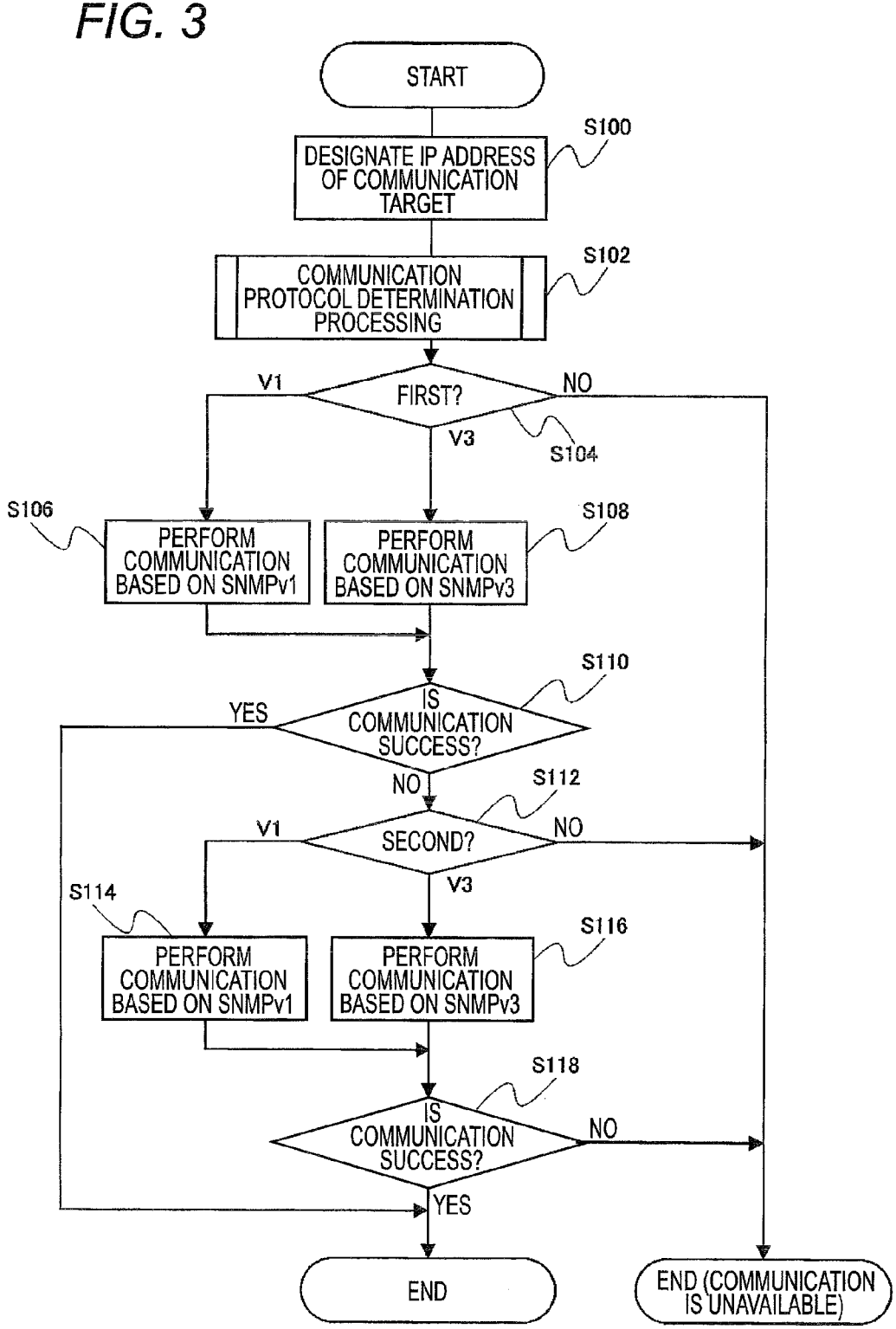
FIG. 3 is a diagram illustrating a flow of communication control processing.

FIG. 3 shows a flow of communication control processing. The communication control processing is processing executed as a part of the processing of the management application 222 when a predetermined input is carried out in the process of allowing the control section 210 of the management device 200 to execute the management application 222. Furthermore, the management application 222 is activated, for example, together with activation of the management device 200. Furthermore, the activation is based on the activation instruction issued through the operation section 230. When the management application 222 is activated, the control section 210 allows the display section 240 to display a management screen.

FIG. 4 is a diagram illustrating a management screen 500 displayed on the display section. The management screen 500 includes: node names (PrinterName in FIG. 2), model names, statuses (Device States, IP addresses, installation locations (Location) thereof, and administrators (Contact) of the respective devices of the multi function peripherals 300A, 300B, 300C, and 300D included in the network system 100. Further, the management screen 500 includes a renewal button 510 that is pressed when the displayed contents are intended to be renewed. When the renewal button 510 is pressed, for example, the control section 210 sequentially communicates with the four devices in order from the multi function peripheral 300A, registers the device information, which is acquired from the multi function peripheral 300A and the like, in the data base 224, and renews the displayed contents of the management screen 500 on the basis of the registered device information. A user operates a mouse and the like constituting the operation section 230, and can select at least one device of the displayed devices. The control section 210 registers the acquired device information in the data base 224 by communicating with each of the selected devices when the instruction to confirm the selection is issued with at least one device selected (for example, when a user double-clicks the mouse). Then, the control section 210 renews the displayed contents on the management screen 500 on the basis of the data base 224 in which the device information is registered.

FIG. 5 shows the data base 224 in which the respective device information is registered. The data base 224 includes not only the respective items displayed on the management screen 500 shown in FIG. 4, but also previous connection information (GET), previous connection information (SET), operation modes, and SNMPv3-compatible specifications ("V3-compatible" noted in FIG. 5). Here, the previous connection information (GET) is a field for registering a protocol that succeeds in communication with the target device in response to the acquisition request executed previously. For example, the protocol, which succeeds in communication with the node name "MFP 300A (the multi function peripheral 300A)" having the IP address "192.168.0.10" in response to the acquisition request executed previously, is the SNMPv1.

Further, the previous connection information (SET) is a field for registering a protocol that succeeds in communication with the target device in response to the setting request executed previously. For example, the protocol, which succeeds in communication with the node name "MFP 300B (the multi function peripheral 300B)" having the IP address "192.168.0.11" in response to the setting request executed previously, is the SNMPv3.

Moreover, the SNMPv3-compatible specification ("V3-compatible" in FIG. 5) is a field for registering whether or not the target device is the SNMPv3-compatible device. For example, since the node name "MFP 300C (the multi function peripheral 300C)" having the IP address "192.168.0.12" is the SNMPv3-compatible device, it is registered that compatibility with v3 is "YES". Further, since the node name "MFP 300D (the multi function peripheral 300D)" having the IP address "192.168.0.13" is the SNMPv3-non-compatible device (SNMPv1-compatible device), it is registered that compatibility with v3 is "-".

Furthermore, the SNMPv1-compatible devices like the multi function peripheral 300D may have a configuration in which the previous connection information (GET), the previous connection information (SET), and the operation modes are not registered in the data base 224. In the following processing, those are not used.

First, the control section 210 acquires an IP address of the target device (the multi function peripherals 300A, 300B, 300C, or 300D in FIG. 1) as the communication target, which is selected by a user with the aid of the operation section 230, from the data base 994, and designates the IP address as receiver address (S100). Furthermore, the control section 210 installs the management application 222 in the storage section 220. In the initial state like first activation, the device information is not registered in the data base 224. In such a case, the control section 210 sequentially designates the respective IP addresses in the range of the predetermined addresses in step S100, performs communication (unicast communication) by setting the designated IP address as receiver, and newly registers the device information, which is acquired by the unicast communication, in the data base 224.

Next, the control section 210 executes, on the basis of the IP address designated in step S100, the communication protocol determination processing (S102). In the communication protocol determination processing, a protocol to be used or priority of protocols to be used is determined. Further, the communication protocol determination processing will be further described later.

The control section 210 makes a determination regarding the first protocol determined in the processing in step S102 (S104). As a result of the determination, if it is determined that communication is not possible with the first protocol (S104: No), it is assumed that the control section 210 is unable to communicate with the target device with the designated IP address, and thus the processing in FIG. 3 is terminated. As a result of the determination, if the SNMPv1 is determined as the first protocol (S104: V1), the control section 210 controls the network I/F 250 to perform communication based on the SNMPv1 by setting the designated IP address as a receiver (S106), and then the processing advances to step S110. Moreover, as a result of the determination, if the SNMPv3 is determined as the first protocol (S104: V3), the control section 910 performs communication based on the SNMPv3 by setting the designated IP address as receiver (S108), and the processing advances to step S110.

In step S110, the control section 210 determines whether or not the communication in step S106 or S108 is a success. Then, when it is determined that the communication is a success (S110: Yes), the control section 210 terminates the processing in FIG. 3. In contrast, when it is determined that the communication is a failure (S110: No), the control section 210 makes a determination regarding the second protocol determined by the processing in step S102 (S112). As a result of the determination, if it is determined that communication is not possible with the second protocol (S112: No), it is assumed that the control section 210 is unable to communicate with the target device with the designated IP address, and thus the processing in FIG. 3 is terminated. As a result of the determination, if the SNMPv1 is determined as the second protocol (S112: V1), the control section 210 controls the network I/F 250 to perform communication based on the SNMPv1 by setting the designated IP address as receiver (S114), and then the processing advances to step S118. Moreover, as a result of the determination, if the SNMPv3 is determined as the second protocol (S112: V3), the control section 210 performs communication based on the SNMPv3 by setting the designated IP address as receiver (S116), and the processing advances to step S118.

In step S118, the control section 210 determines whether or not the communication in step S114 or S116 is a success. Then, when it is determined that the communication is a success (S118: Yes), the control section 210 terminates the processing in FIG. 3. In contrast, when it is determined that the communication is a failure (S118: No), it is assumed that the control section 210 is unable to communicate with the target device with the designated IP address, and thus the processing in FIG. 3 is terminated.

Furthermore, for example, a plurality of the target devices may exist, and a plurality of IP addresses may be designated in step S100. Alternatively, the unicast communication may be performed, and a plurality of IP addresses may be designated in step S100. In these cases, the communication control processing in FIG. 3 is repeated whenever the processing for each IP address is terminated.

Figure 6B:
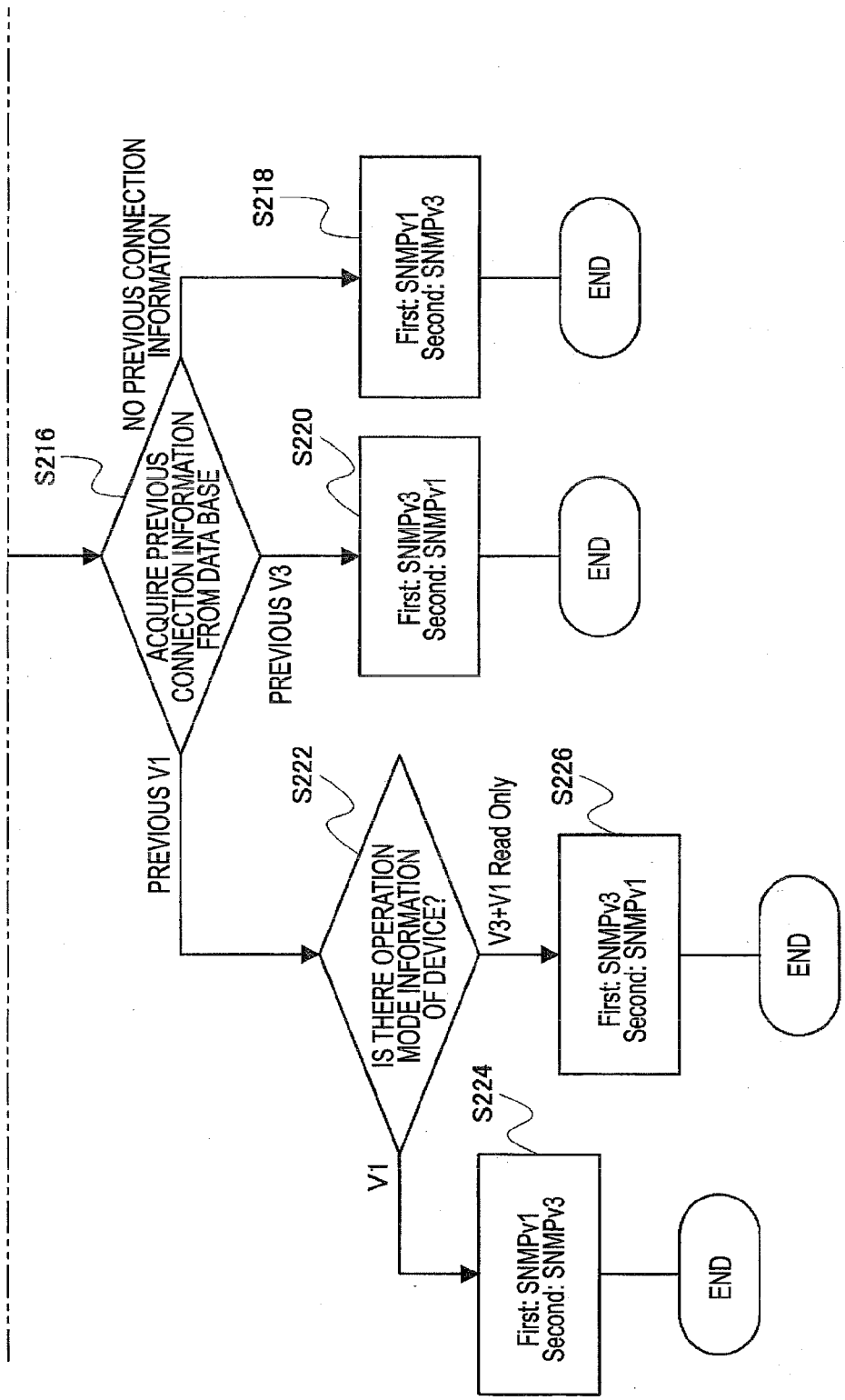

(Communication Protocol Determination Processing)
FIG. 6 shows a flow of communication protocol determination processing executed in step S102 of FIG. 3.

The control section 210 acquires the mode set in the management application 222 for executing the communication control processing including the communication protocol determination processing, and determines whether only the SNMPv1 is available or only the SNMPv3 is available in the acquired management application mode (S200).

If it is determined that only the SNMPv1 is available for the management application mode in step S200 (S200: only the V1 is available), the control section 210 sets the SNMPv1 as first in the order of priority of the protocols, which are used in communication (S202). Furthermore, in step S202, the control section 210 does not determine a second protocol. In other words, the control section 210 determines that there is "no" second protocol. The reason is that, in this mode, the management application 222 is set to perform management for which security is not required by using the SNMPv1.

Further, if it is determined that only the SNMPv3 is available in the management application mode in step S200 (S200: V3), the control section 210 acquires an SNMPv3-compatible specification (FIG. 5) from the record within the data base 224 in which the IP address coinciding with the IP address designated in step S100 is registered. Then, it is determined whether or not the target device to which the IP address is set is the SNMPv3-compatible device (S204). As a result of the determination, if the target device is the SNMPv3-non-compatible device (S204: V3-non-compatible device), the control section 210 advances the processing to step S206. In contrast, if the target device is the SNMPv3-compatible device (S204: V3-compatible device or no information on compatibility), the processing advances to step S208. Furthermore, if the IP address coinciding with the designated IP address is not registered in the data base 224, the control section 210 determines that the target device is the SNMPv3-compatible device (S204: V3-compatible device or no information on compatibility). For example, as described above, if the management application 222 is in an initial state right after the management application 222 is installed, the processing of FIGS. 3 and 6 is not performed yet. In this case, the code compatible with the designated IP address is not registered in the data base 224, and thus it is determined that "there is no information on compatibility".

In step S206, since the management application 222 set so that only the SNMPv3 is available is unable to communicate with the target device which is the SNMPv3-non-compatible device (SNMPv1-compatible device), the control section 210 determines that there are "no" first and second protocols. For example, in the multi function peripheral 300D, determination is made as described above. Further, in step S208, the control section 210 sets the SNMPv3 as first in the order of priority of the protocols, which are used in communication, and determines that there is "no" second protocol. For example, in the multi function peripherals 300A to 300C as the SNMPv3-compatible devices, determination is made as described above. The reason is that, in this mode of the management application, the management application 222 is set to perform management for which security is required by using the SNMPv3. Furthermore, this determination is also made in the multi function peripheral 200A. The reason is that the operation mode of the multi function peripheral 300A previously set as the first mode (SNMPv1-R/W) is likely to be changed into another mode (that is, the second mode or the third mode).

Furthermore, if it is determined that both the SNMPv1 and the SNMPv3 are available in the management application mode in step S200 (S200: both V1 and V3 are available), the control section 210 acquires the SNMPv3-compatible specification of the target device specified by the designated IP address from the data base 224, and determines whether or not the target device specified by the designated IP address is the SNMPv3-compatible device (S210).

If it is determined that the IP address coinciding with the designated IP address is not registered in the data base 224 in step S210 (S210: no information on compatibility), the control section 210 sets the SNMPv1 as first in the order of priority of the protocols, which are used in communication, and sets the SNMPv3 as second (S212). The reason why the SNMPv1 is set as the first is that it is necessary for the SNMPv1 which is widely spread to have priority. Furthermore, in the case of the initial state mentioned above, it is determined that there is "no information on compatibility" in step S210. That is, if the processing of FIGS. 3 and 6 is performed for first time, the record corresponding to the designated IP address is not registered yet in the data base 224, and thus it is determined that there is "no information on compatibility".

Further, if it is determined that the target device specified by the IP address designated in step S100 is the SNMPv3-non-compatible device (SNMPv1-compatible device) in step S210 (S210: V3-non-compatible device), the control section 210 set the SNMPv1 as first in the order of priority of the protocols, which are used in communication, and determines that there is "no" second protocol (S214). For example, in the multi function peripheral 200n as the SNMPv1-compatible device, determination is made as described above.

In contrast, if it is determined that the target device specified by the IP address designated in step S100 is the SNMPv3-compatible device in step S210 (S210: V3-compatible device), the control section 210 acquires the previous connection information from the corresponding record within the data base 224, and determines the connection state at the previous time (S216). In step S216, the control section 210 determines the type of the communication at the current time. Specifically, the control section 210 determines which one of the acquisition request or the setting request the current communication is, and acquires the previous connection information based on the type of the communication corresponding to the determination result. For example, if the current communication is the acquisition request, the control section 210 acquires the previous connection information from the field, in which the "previous connection information (GET)" is registered, in the data base 224. In contrast, if the current communication is the setting request, the control section 210 acquires the previous connection information from the field, in which the "previous connection information (SET)" is registered, in the data base 224.

If it is determined that the previous connection information based on the type of the current communication is not registered in the data base 224 in step S216 (S216: no previous connection information), the control section 210 sets the SNMPv1 as first in the order of priority of the protocols, which are used in communication, and sets the SNMPv3 as the second (S218). The reason why the SNMPv1 has priority is the same as step S212. Furthermore, for example, the communication relating to the acquisition request may be performed already, but the communication relating to the setting request may not be performed yet. In this case, registration of the SNMPv1 or the SNMPv3 is completed in the "previous connection information (GET)" of the record corresponding to the data base 224 as shown in FIG. 5, but the registration of the SNMPv1 or SNMPv3 is not completed in the "previous connection information (SET)". In such a state, if the current communication is the setting request, the control section 210 determines that there is "no previous connection information" in step S216. Further, if it is determined that the SNMPv3 is registered as the previous connection information based on the type of the current communication in the data base 224 (S216: previous V3) in step S216, the control section 210 sets the SNMPv3 as first in the order of priority of the protocols, which are used in communication, and sets the second to the SNMPv1 (S220). The reason is that the communication is attempted with the same protocol as the previous communication.

In contrast, if it is determined that the SNMPv1 is registered as the previous connection information based on the type of the current communication in the data base 224 in step 216 (S216: previous V1), the control section 210 advances the processing to step S222. Then, in step S222, the control section 210 determines the operation mode of the target device specified by the designated IP address on the basis of the "operation mode" registered in the data base 224 (S222). As a result of the determination, if the operation mode of the target device is the first mode (SNMPv1-R/W) (S222: V1), the control section 210 sets the SNMPv1 as first in the order of priority of the protocols, which are used in communication, and sets the SNMPv3 as second (S224). Furthermore, the reason why the second is set to the SNMPv3 is that the operation mode of the target device is likely to be changed into a mode (the second mode or the third mode) other than the first mode by another management application or the like, after the previous communication.

In contrast, if the operation mode is the third mode (SNMPv3-R/W+SNMPv1-R/O) (S222: V3+V1 Read Only), the control section 210 sets the SNMPv3 as first in the order of priority of the protocols, which are used in communication, and sets the SNMPv1 as second (S226). As described above, for example, when receiving the acquisition request based on the SNMPv1, the target device set in the third mode replies that the device information on the acquisition request is not registered. Specifically, the multi function peripheral 300C set in the third mode may receive the acquisition request based on the SNMPv1. In this case, when the specific device information on the acquisition request is information included in the region b shown in FIG. 2, the multi function peripheral 300C replies that the specific device information on the acquisition request is not registered in the MIB 322. Accordingly, in the communication protocol determination processing, when "V3+V1 Read Only" is determined in step S222, a configuration is adopted in which the first protocol is set as the SNMPv3 in order to prevent erroneous determination that the acquisition and the setting for the acquisition request or the setting request based on the communication is disallowed.

Furthermore, after execution of processing in steps S202, S206, S208, S212, S214, S218, S220, S224 and S226, the control section 210 terminates the communication protocol determination processing, and advances the processing to step S104 of the communication control processing in FIG. 3.

Advantages Due to Configuration According to the Embodiment

According to the configuration of the embodiment, the control section 210 of the management device 200 may communicate the acquisition requests or the setting requests to the respective communication target devices (the multi function peripherals 300A, 300B, 300C, and 300D). In this case, the control section 210 determines the protocol to be used first in communication with the target device (step S102 in FIG. 3, steps S220 and S224 in FIG. 6 are detailed description thereof), and transmits the acquisition requests and the setting requests in accordance with the determined protocols (steps S106, S108, S114, and S116 in FIG. 3). Hence, it is possible to reduce unnecessary communication. This point is additionally described with reference to FIGS. 7 and 8.

Figure 7:
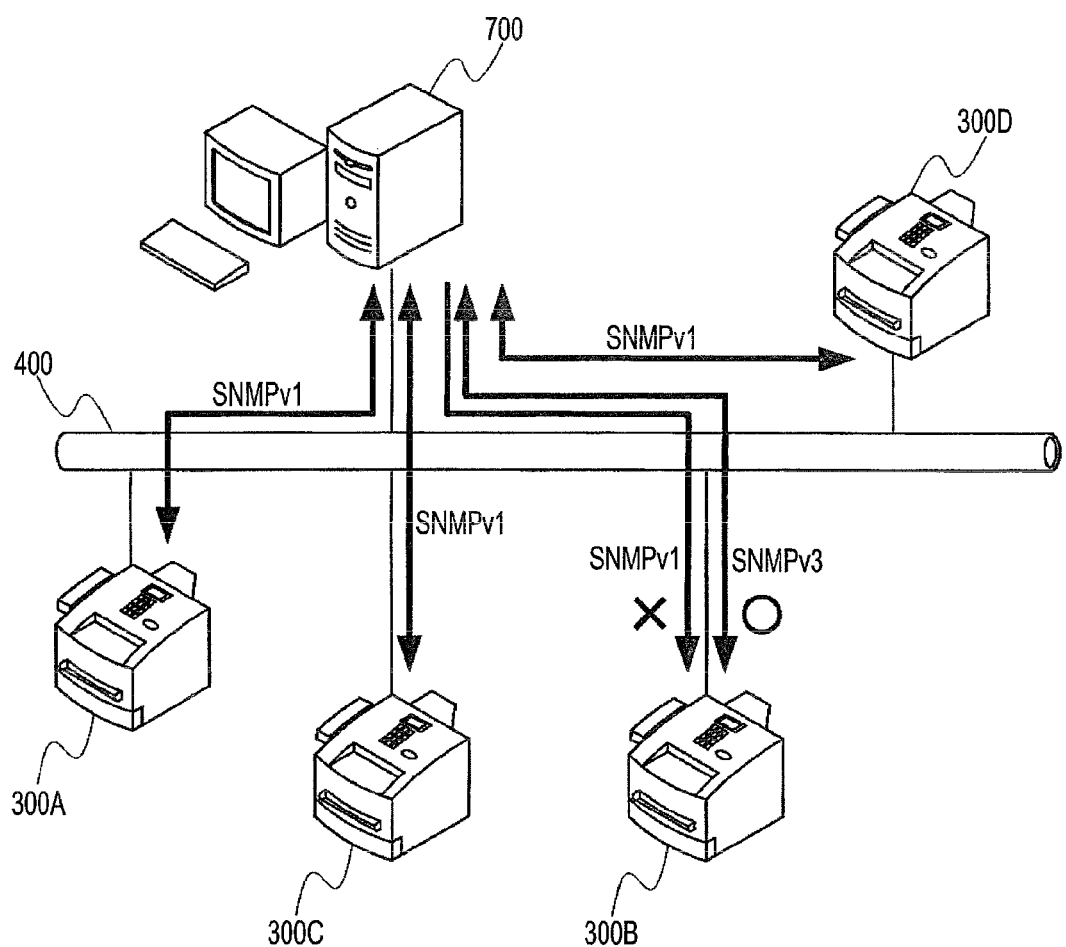
FIG. 7 is a diagram illustrating communication based on a comparative configuration.

FIG. 7 shows communication based on a comparative configuration. Furthermore, in the comparative configuration, it is assumed that the management device 700 attempts the communication based on the SNMPv1 with the target devices (the multi function peripherals 300A, 300B, 300C, and 300D) first. Further, description is given below under the premise that the data transmitted from the management device 700 is the acquisition request.

The control section of the management device 700 transmits the acquisition request based on the SNMPv1 to the multi function peripheral 300A set in the first mode (SNMPv1-R/W). The multi function peripheral 300A receives the acquisition request, and transmits the device information corresponding to the OID designated by the acquisition request by setting the management device 700 as a receiver. Furthermore, the bidirectional arrow indicating the communication between the management device 700 and the multi function peripheral 300A means that the communication is a success (hereinafter the same).

Next, the control section of the management device 700 transmits the acquisition request based on the SNMPv1 to the multi function peripheral 300B set in the second mode (SNMPv3-R/W). The multi function peripheral 300B receives the acquisition request, but does not respond thereto since the request is based on the SNMPv1. The control section is on standby for a predetermined time after the transmission of the acquisition request, and then determines time-out when the predetermined time elapses (refer to "X" shown in FIG. 7). Then, the control section transmits the acquisition request based on the SNMPv3 to the multi function peripheral 300B. The multi function peripheral 300B receiving the acquisition request based on the SNMPv3 receives this, and transmits the device information corresponding to the OID designated by the received acquisition request to the management device 700 as the receiver. As described above, between the control section of the management device 700 and the multi function peripheral 300B, the communication based on the SNMPv1 to which the multi function peripheral 300B is unable to respond is unnecessarily performed.

Next, the control section of the management device 700 transmits the acquisition request based on the SNMPv1 to the multi function peripheral 300C set in the third mode (SNMPv3-R/W+SNMPv1-R/O). The multi function peripheral 300C receives the acquisition request. Then, if the received acquisition request relates to response-capable device information (that is, the device information in the region (a-b) in FIG. 2, for example, a printer name), the multi function peripheral 300C transmits the device information corresponding to the designated OID by setting the management device 700 as a receiver. However, if the acquisition request is response-incapable device information (that is, the device information in the region b in FIG. 2), the multi function peripheral 300C sends a reply to the effect that the designated device information is not registered, regardless of whether or not the designated device information is registered.

When receiving the reply from the multi function peripheral 300C, the control section of the management device 700 is unable to determine whether or not the device information can be acquired from the multi function peripheral 300C by performing the acquisition request on the basis of the SNMPv3. Even if it is possible to acquire the device information by performing the acquisition request based on the SNMPv3, the first communication is unnecessary. Further, in practice, if the acquisition request relates to the device information which is not registered in the MIB 322 of the multi function peripheral 300C, the communication based on the SNMPv3 also becomes unnecessary. Furthermore, in the case of the setting request, the first communication based on the SNMPv1 is a failure, and thus the communication becomes unnecessary.

Finally, the control section of the management device 700 transmits the acquisition request based on the SNMPv1 to the multi function peripheral 300D as the SNMPv3-non-compatible device (SNMPv1-compatible device). The multi function peripheral 300D receives the acquisition request, and transmits the device information corresponding to the OID designated by the acquisition request by setting the management device 700 as a receiver.

Figure 8:
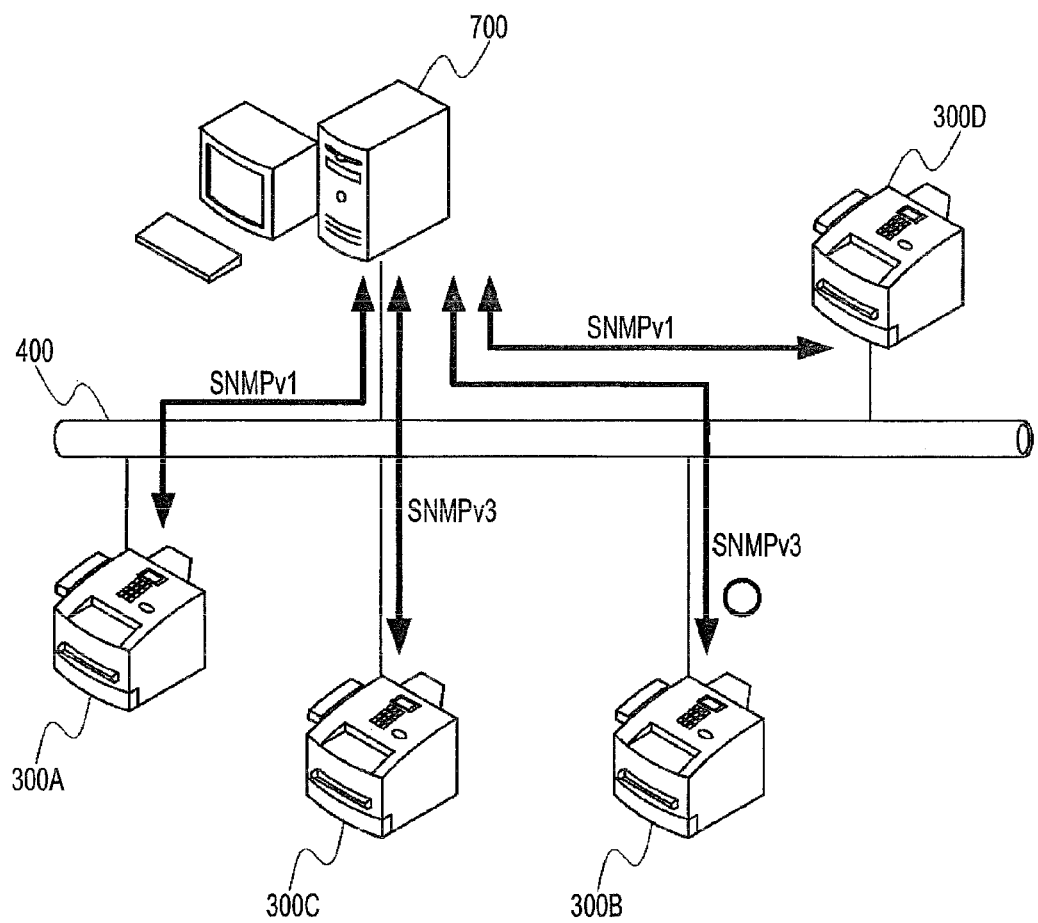
FIG. 8 is a diagram illustrating communication based on a configuration of the embodiment.

Next, the communication based on the configuration of the embodiment is described with reference to FIG. 8. In the configuration of the embodiment, the control section 210 of the management device 200 determines the order of priority of the protocols used in communication with the respective target devices, on the basis of the registration contents of the data base 224 as described above.

Specifically, in the multi function peripheral 300A set in the first mode (SNMPv1-R/W), the SNMPv1 is set as the first protocol (for example, refer to step S224 in FIG. 6), thereby performing communication (refer to step S106 in FIG. 3).

Next, in the multi, function peripheral 300B set in the second mode (SNMPv3-R/W), the SNMPv3 is determined as the first protocol (for example, refer to step S220 in FIG. 6), thereby performing communication (step S108 in FIG. 3). In this case, the control section 210 is able to acquire the device information from the multi function peripheral 300B set in the second mode by performing communication once.

Next, in the multi function peripheral 300C set in the third mode (SNMPv3-R/W+SNMPv1-R/O), the SNMPv3 is determined as the first protocol (for example, refer to step S226 in FIG. 6), thereby performing communication (step S108 in FIG. 3).

Finally, in the multi function peripheral 300D as the SNMPv3-non-compatible device (SNMPv1-compatible device) is determined as the first protocol (for example, refer to step S214 in FIG. 6), thereby performing communication (step S106 in FIG. 3).

As described above, according to the configuration of the embodiment, it is possible to prevent (reduce) the communication to which the target device is unable to respond between the control section 210 of the management device 200 and the target device.

Correspondence Between the Invention and the Embodiment

The management device 200 according to the embodiment corresponds to the management device according to the invention. Further, the multi function peripheral 300A as the SNMPv3-compatible device set in the first mode according to the embodiment corresponds to the second type device of the first mode according to the invention. The multi function peripheral 300B as the SNMPv3-compatible device set in the second mode according to the embodiment corresponds to the second type device of the second mode according to the invention. The multi function peripheral 300C as the SNMPv3-compatible device set in the third mode according to the embodiment corresponds to the second type device of the third mode according to the invention. In addition, the multi function peripheral 300D as the SNMPv1-compatible device according to the embodiment corresponds to the first type device according to the invention.

Further, step S210 in FIG. 6 corresponds to the processing executed by the device determination means according to the invention. Further, steps S212, S214, S220, S224, and S226 in FIG. 6 correspond to the processing executed by the available-protocol determination means according to the invention. Moreover, step S216 in FIG. 6 corresponds to the processing executed by the processing determination means according to the invention. Furthermore, in the specification, the "SNMPv1" is defined to include not only the SNMPv1 but also the SNMPv1/v2c.

In the above exemplary embodiments, the ROM storing the program for installing application software is employed as an example of the computer readable recording medium according to the invention. However, the computer readable recording medium according to the invention is not limited to the ROM. The computer readable recording medium according to the invention may be any computer readable recording medium, such as an optical disk (CD-ROM, DVD-ROM, etc.), flash memory, a hard disk and the like, storing the program.

What is claimed is:

1. A management device for managing a first type device that is compatible with a first protocol and is not compatible with a second protocol and a second type device that is compatible with the first protocol and the second protocol, the second type device being set in any one of a plurality of operation modes including a first mode in which communication is available not through the second protocol but through the first protocol, and a second mode in which communication is available not through the first protocol but through the second protocol, the management device comprising:
   a device determination unit that determines whether a target device as a target of current communication is the first type device or the second type device;
   an available-protocol determination unit that, if the device determination unit determines that the target device is the second type device, identifies the protocol used in previous communication with the target device, and determines priority of the protocol to be used to attempt the current communication with the target device;
   a communication unit that attempts communication with the target device in accordance with the priority of the protocol determined by the available-protocol determination unit; and
   a processing determination unit which determines whether information is to be set in the target device or information is to be acquired from the target device in the current communication,
   wherein the available-protocol determination unit
      identifies the protocol used in the previous communication for setting the information in the target device if the information is to be set in the target device in the current communication,
      identifies the protocol used in the previous communication for acquiring the information from the target device if the information is to be acquired from the target device in the current communication,
      sets the priority of the protocol in order of the second protocol and the first protocol if the previous communication is performed through the second protocol, and
      sets the priority of the protocol in order of the first protocol and the second protocol if the previous communication is performed through the first protocol.

2. The management device according to claim 1, wherein the available-protocol determination unit sets the priority of the protocol in order of the first protocol and the second protocol when not able to identify the protocol used in the previous communication.

3. The management device according to claim 1,
   wherein the plurality of operation modes includes the first mode, the second mode, and a third mode in which communication is available through the first protocol and the second protocol,
   wherein the available-protocol determination unit
      determines the operation mode of the target device if the previous communication is performed through the first protocol,
      sets the priority of the protocol in order of the first protocol and the second protocol if the operation mode is the first mode, and
      sets the priority of the protocol in order of the second protocol and the first protocol if the operation mode is the third mode.

4. The management device according to claim 1, wherein the available-protocol determination unit determines the protocol to be used to attempt the current communication with the target device as the first protocol if it is determined that the target device is the first type device.

5. The management device according to claim 1, wherein the available-protocol determination unit sets the priority of the protocol to be used to attempt the current communication with the target device in order of the first protocol and the second protocol if it is unclear whether the target device is the first type device or the second type device.

6. The management device according to claim 1, wherein the device determination unit determines whether the target device is the first type device or the second type device for each communication with the target device.

7. The management device according to claim 1, wherein the first protocol and the second protocol are SNMPs (Simple Network Management Protocol) having different versions.

8. The management device according to claim 7, wherein the first protocol is SNMPv1, and the second protocol is SNMPv3.

9. A non-transitory computer readable medium storing a computer program that can be carried out by a management device for managing a first type device which is compatible with a first protocol and is not compatible with a second protocol and a second type device which is compatible with the first protocol and the second protocol, the second type device being set in any one of a plurality of operation modes including a first mode in which communication is available not through the second protocol but through the first protocol, and a second mode in which communication is available not through the first protocol but through the second protocol, the computer program causing the management device to function as:
   a device determination unit that determines whether a target device as a target of current communication is the first type device or the second type device;
   an available-protocol determination unit that, if the device determination unit determines that the target device is the second type device, identifies the protocol used in previous communication with the target device, and determines priority of the protocol to be used to attempt the current communication with the target device;

a communication unit that attempts communication with the target device in accordance with the priority of the protocol determined by the available-protocol determination unit; and a processing determination unit which determines whether information is to be set in the target device or information is to be acquired from the target device in the current communication, wherein the available-protocol determination unit identifies the protocol used in the previous communication for setting the information in the target device if the information is to be set in the target device in the current communication, identifies the protocol used in the previous communication for acquiring the information from the target device if the information is to be acquired from the target device in the current communication, sets the priority of the protocol in order of the second protocol and the first protocol if the previous communication is performed through the second protocol, and sets the priority of the protocol in order of the first protocol and the second protocol if the previous communication is performed through the first protocol.

10. A method of managing a first type device that is compatible with a first protocol and is not compatible with a second protocol and a second type device that is compatible with the first protocol and the second protocol, the second type device being set in any one of a plurality of operation modes including a first mode in which communication is available not through the second protocol but through the first protocol, and a second mode in which communication is available not through the first protocol but through the second protocol, the method comprising:

determining whether a target device as a target of current communication is the first type device or the second type device;

determining whether information is to be set in the target device or information is to be acquired from the target device in the current communication;

identifying the protocol used in previous communication with the target device if it is determined that the target device is the second type device;

identifying the protocol used in the previous communication for setting the information in the target device if the information is to be set in the target device in the current communication;

identifying the protocol used in the previous communication for acquiring the information from the target device if the information is to be acquired from the target device in the current communication;

determining priority of the protocol to be used to attempt the current communication with the target device so that the priority of the protocol is set in order of the second protocol and the first protocol if the previous communication is performed through the second protocol, and is set in order of the first protocol and the second protocol if the previous communication is performed through the first protocol; and attempting communication with the target device in accordance with the determined priority of the protocol.

11. A management device for managing a first type device that is compatible with a first protocol and is not compatible with a second protocol and a second type device that is compatible with the first protocol and the second protocol, the second type device being set in any one of a plurality of operation modes including a first mode in which communication is available not through the second protocol but through the first protocol, and a second mode in which communication is available not through the first protocol but through the second protocol, the management device comprising:

a device determination unit that determines whether a target device as a target of current communication is the first type device or the second type device;

an available-protocol determination unit that, if the device determination unit determines that the target device is the second type device, identifies the protocol used in previous communication with the target device, and determines priority of the protocol to be used to attempt the current communication with the target device; and a communication unit that attempts communication with the target device in accordance with the priority of the protocol determined by the available-protocol determination unit, wherein the available-protocol determination unit sets the priority of the protocol in order of the second protocol and the first protocol if the previous communication is performed through the second protocol, sets the priority of the protocol in order of the first protocol and the second protocol if the previous communication is performed through the first protocol, wherein the plurality of operation modes includes the first mode, the second mode, and a third mode in which communication is available through the first protocol and the second protocol, wherein the available-protocol determination unit further determines the operation mode of the target device if the previous communication is performed through the first protocol, sets the priority of the protocol in order of the first protocol and the second protocol if the operation mode is the first mode, and sets the priority of the protocol in order of the second protocol and the first protocol if the operation mode is the third mode.

\* \* \* \* \*